J. H. SALTSMAN.
MEANS FOR DRAINING MARSHY AND SWAMPY LAND.
APPLICATION FILED JAN. 5, 1920.
1,344,656.  Patented June 29, 1920.
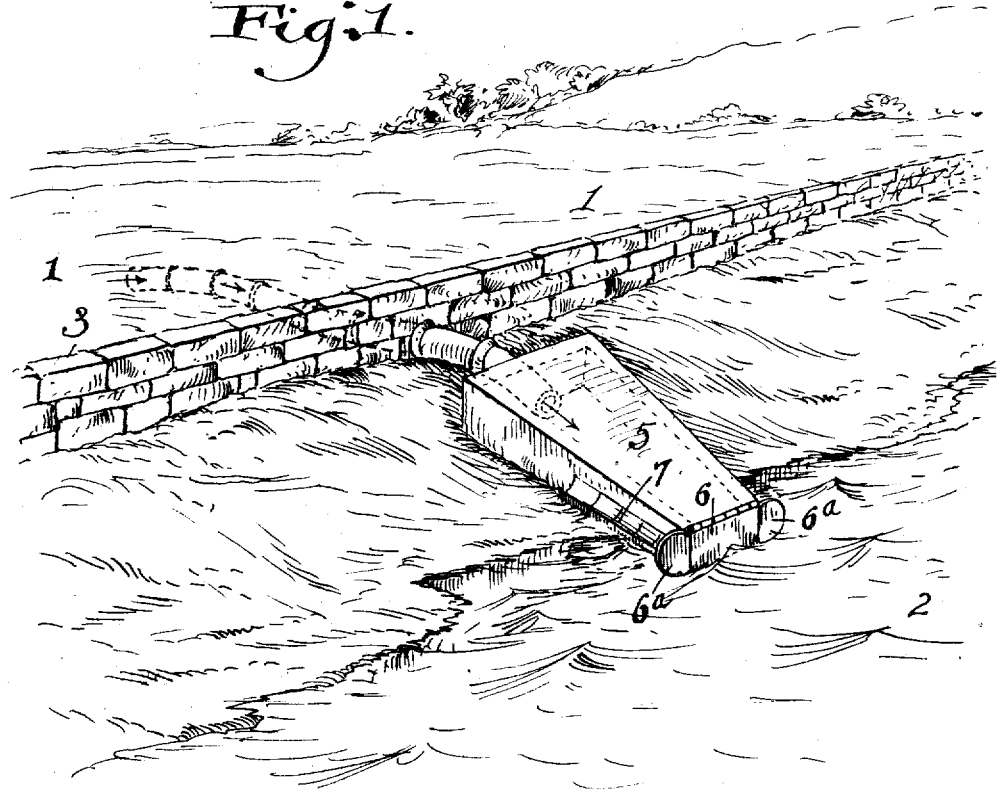
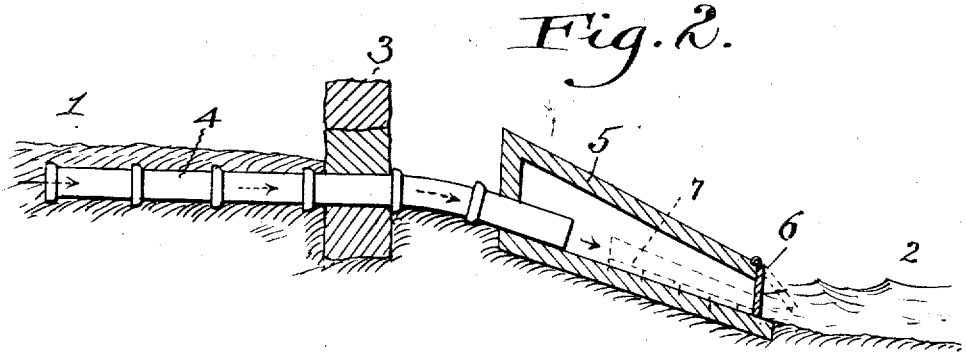

UNITED STATES PATENT OFFICE.

JOSEPH H. SALTSMAN, OF CLEVELAND, OHIO.

MEANS FOR DRAINING MARSHY AND SWAMPY LAND.

1,344,656.　　　　　Specification of Letters Patent.　　Patented June 29, 1920.

Application filed January 5, 1920. Serial No. 349,600.

*To all whom it may concern:*

Be it known that I, JOSEPH H. SALTSMAN, a citizen of the United States, residing at Cleveland, in the county of Cuyahoga and State of Ohio, have invented a certain new and useful Improvement in Means for Draining Marshy and Swampy Land, of which the following is a full, clear, and exact description.

The present invention relates to an apparatus which is particularly intended to be utilized to drain swamps, marshy lands and low lands which border on an ocean or any other body of water such as bays, gulfs, etc., where the same is subjected to the tides or storms which cause water to flow in over the swamps or similar low lands thereby continually keeping them in swampy or marshy condition.

The object of the invention is to provide a construction whereby the water from the marshy lands or swamps is drained and emptied into the ocean or other body of water, the construction being such as to permit the passage of water from the swamps or marshy lands at all times whether at high tide or low tide and to prevent a return of water to the low lands at all times.

Referring to the drawings, Figure 1 is a perspective view showing the application of my invention; Fig. 2 is a sectional elevation.

Referring to the drawing, 1 indicates low lying land which lies adjacent or approximate to the ocean, a bay gulf or other body of water which is effected by tides and which is normally in swampy condition due to the influx of water at high tide or during a storm.

Such land as indicated at 1 as before stated lies adjacent to the body of water such as indicated at 2.

It is the purpose of this invention to provide a construction which embodies a wall such as indicated at 3 which may extend along parallel with the shore or in the event that the water finds ingress to the low lands through ravines or low places between banks of earth, the wall need only extend across those low portions where the land does not form a natural barrier. Extending through the wall 3 is a conduit 4 which may be made up of a series of sections of vitreous pipe and the outer end of the conduit 4 extends into one end of a box like container 5 which is closed except at its lower end where it is provided with a pivoted valve 6. The container 5 is maintained in a slanting position so that water passing through the conduit 4 into the container 5 will naturally flow toward the outlet which is covered by the valve 6 and the weight of the water accumulating in the container 5 will normally be sufficient to open the valve 6.

The water of the ocean or bay or gulf or whatever the case may be, particularly as the tide comes in or during a storm will when it impinges against the valve 6, force the valve more completely to its seat and hence will not permit the entry of water into the container 5 and as will be understood the wall or dam 3 will be of sufficient height so as to prevent the water at high tide or during storm from passing over the wall or dam.

In order to assist the operation of the valve 6 I have provided the ends of the valve with ears or extensions 6ª and secured to the container 5 at the edges and behind the ear 6ª are troughs 7. These troughs are for the purpose of guiding the water during the back flow after a wave has passed toward the shore, which back flow of water will impinge against the ear 6ª and cause the valve 6 to open so that water may flow out of the container.

From the foregoing it will be apparent that water may continually flow from the marshy lands into the container 5 but no water can pass from the ocean or bay as the case may be, back on the marshy lands.

As will be understood, there may be a number of such devices as have been described which serve to drain a given piece of marshy land. Not only will the apparatus as described serve to drain the marshy land, but will also serve to take care of the natural drainage after the land has assumed a dry and solid condition.

Having described my invention, I claim—

1. Apparatus for draining marshy and swampy land, comprising a wall, a conduit extending across the wall, a container with which the conduit communicates, a valve located adjacent one end of the container, said valve being provided with extensions and trough members carried by the container, which troughs are located behind the said extensions.

2. Apparatus for draining marshy and swampy land, comprising a wall, a conduit extending across the wall, a container with which the conduit communicates, said container being mounted in a slanting position, a valve located at the lower end of the container, extensions upon said valve, trough members carried by the container and positioned behind the said extensions.

In testimony whereof I hereunto affix my signature.

JOSEPH H. SALTSMAN.